US012630156B2

(12) United States Patent
Inoue et al.

(10) Patent No.: US 12,630,156 B2
(45) Date of Patent: May 19, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Daichi Inoue, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 243 days.

(21) Appl. No.: 18/523,945

(22) Filed: Nov. 30, 2023

(65) Prior Publication Data

US 2024/0182024 A1 Jun. 6, 2024

(30) Foreign Application Priority Data

Dec. 2, 2022 (JP) ................................. 2022-193425

(51) Int. Cl.
| *B60W 30/10* | (2006.01) |
| *B60W 60/00* | (2020.01) |
| *G01C 21/00* | (2006.01) |

(52) U.S. Cl.
CPC ........... *B60W 30/10* (2013.01); *B60W 60/001* (2020.02); *B60W 2420/403* (2013.01); *B60W 2552/10* (2020.02); *B60W 2552/53* (2020.02); *B60W 2554/20* (2020.02)

(58) Field of Classification Search
None
See application file for complete search history.

(56) References Cited

U.S. PATENT DOCUMENTS

| 9,141,109 B1* | 9/2015 | Kamata ............... B60W 50/023 |
| 10,739,144 B2* | 8/2020 | Watanabe .......... G01C 21/3848 |
| 11,157,001 B2* | 10/2021 | Yoo ........................ G01C 21/30 |
| 11,341,847 B1* | 5/2022 | Beaurepaire ......... G08G 1/0133 |
| 11,747,166 B2* | 9/2023 | Fujita ................... G06V 20/588 |
| | | 701/450 |
| 11,879,748 B2* | 1/2024 | Chikamori ......... G01C 21/3841 |
| 12,123,740 B2* | 10/2024 | Miyagawa .............. G01S 19/01 |
| 2005/0033516 A1* | 2/2005 | Kawasaki .............. G01C 21/26 |
| | | 340/436 |

(Continued)

FOREIGN PATENT DOCUMENTS

JP 2022-104150 7/2022

*Primary Examiner* — Jonathan M Dager
(74) *Attorney, Agent, or Firm* — Amin, Turocy & Watson, LLP

(57) ABSTRACT

A vehicle control device is configured to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, and control traveling of the vehicle so that the vehicle travels in the generated traveling possible region, and the processor further sets any one of the first information and the second information as priority information based on information regarding one or more stationary targets included in the first information or the second information to generate the traveling possible region from the set priority information.

7 Claims, 7 Drawing Sheets

(56) References Cited

U.S. PATENT DOCUMENTS

| | | | | |
|---|---|---|---|---|
| 2016/0146618 A1* | 5/2016 | Caveney | ............... | B60W 50/16 |
| | | | | 701/25 |
| 2017/0122749 A1* | 5/2017 | Urano | ..................... | G01S 19/42 |
| 2017/0123434 A1* | 5/2017 | Urano | .............. | G08G 1/096791 |
| 2017/0176193 A1* | 6/2017 | Chau | .................. | G01C 21/3655 |
| 2020/0362536 A1* | 11/2020 | Shimamura | .......... | A01B 69/008 |
| 2021/0199463 A1* | 7/2021 | Kitahara | ............ | G01C 21/3815 |
| 2021/0402992 A1* | 12/2021 | Morimoto | ............. | B60W 30/12 |
| 2023/0234608 A1* | 7/2023 | Tomioka | ........... | B60W 30/0956 |

* cited by examiner

1

PATTERN(c)

VEHICLE CONTROL DEVICE, VEHICLE CONTROL METHOD, AND STORAGE MEDIUM

CROSS-REFERENCE TO RELATED APPLICATION

This application is based upon and claims the benefit of priority from Japanese Patent Application No. 2022-193425, filed Dec. 3, 2022, the entire contents of which is incorporated herein by reference.

BACKGROUND

Field of the Invention

The present invention relates to a vehicle control device, a vehicle control method, and a storage medium.

Description of Related Art

In the related art, technology for specifying the position of a vehicle by comparing a camera image representing a surrounding situation imaged by a camera mounted on the vehicle with map information and driving the vehicle based on the specified position is known. For example, Japanese Unexamined Patent Application, First Publication No. 2022-104150 discloses technology for calculating the amount of movement of a vehicle by dead reckoning, calculating a first host vehicle position based on the calculated amount of movement of the vehicle, calculating a second host vehicle position by comparing an image captured by an imaging device with a map, and estimating the position of the vehicle on the map based on the first host vehicle position and the second host vehicle position.

However, in the related art, for example, when a vehicle drives at a branch of a road, a deviation occurs between road marking lines captured in a camera image and road marking lines included in map information, and the vehicle may not be driven appropriately.

SUMMARY

The present invention has been made in view of such circumstances, and an object thereof is to provide a vehicle control device, a vehicle control method, and a storage medium which make it possible to appropriately drive a vehicle even when a deviation occurs between road marking lines captured in a camera image and road marking lines included in map information. It also contributes to the development of sustainable transportation systems.

A vehicle control device, a vehicle control method, and a storage medium according to the present invention adopt the following configurations.

(1) A vehicle control device according to one aspect of the present invention includes a storage medium configured to store computer-readable instructions, and a processor configured to be connected to the storage medium, in which the processor executes the computer-readable instructions to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, and control traveling of the vehicle so that the vehicle travels in the generated traveling possible region, and the processor further sets any one of the first information and the second information as priority information based on information regarding one or more stationary targets included in the first information or the second information to generate the traveling possible region from the set priority information.

(2) The processor plots the traveling route shape included in the first information, the traveling route shape included in the second information, and one or more stationary targets included in the first information or the second information in the same coordinate system, and the processor sets the second information as the priority information when the stationary targets are within the traveling route shape included in the first information in the coordinate system, and sets the first information as the priority information when the stationary targets are within the traveling route shape included in the second information.

(3) In the aspect of (1) described above, the processor plots the first information, the second information, and the stationary target in the same coordinate system, the processor classifies the stationary targets into a vehicle stationary target representing a vehicle and a non-vehicle stationary target representing a non-vehicle, and when the vehicle stationary target is within the traveling route shape included in one of the first information and the second information, and one or more of the non-vehicle stationary targets are disposed in the traveling route shape included in the other of the first information and the second information, the processor sets the one of the first information and the second information as the priority information.

(4) In the aspect of (1) described above, when the processor determines that the vehicle is near a branch road, the processor generates the traveling possible region based on the first information and the second information.

(5) In the aspect of (1) described above, the processor sets the first information and the second information as a region sandwiched by a left road marking line and a right road marking line in front of the vehicle, and generates the traveling possible region based on information regarding the one or more stationary targets plotted in the set region.

(6) In the aspect of (1) described above, the processor sets any one of the first information and the second information as priority information based on a region including the one or more stationary targets obtained by adding an allowance size to detected sizes of the one or more stationary targets to generate the traveling possible region.

(7) A vehicle control method according to another aspect of the present invention includes causing a computer to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, control traveling of the vehicle so that the vehicle travels in the generated traveling possible region, and set any one of the first information and the second information as priority information based on information regarding one or more stationary targets included in the first information or the second information to generate the traveling possible region from the set priority information.

(8) A non-temporary storage medium according to another aspect of the present invention is a non-temporary storage medium that stores a program causing a computer to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, control traveling of the vehicle so that the vehicle travels in the generated traveling possible region, and set any one of the first information and the second information as priority information based on information regarding one or more stationary targets included in the first information or the second information to generate the traveling possible region from the set priority information.

According to the aspects (1) to (8), even when a deviation occurs between road marking lines captured in a camera image and road marking lines included in map information, a vehicle can be driven appropriately.

DESCRIPTION OF EMBODIMENTS

DESCRIPTION OF EMBODIMENTS

Hereinafter, an embodiment of a vehicle control device, a vehicle control method, and a program of the present invention will be described with reference to the drawings.

Figure 1:
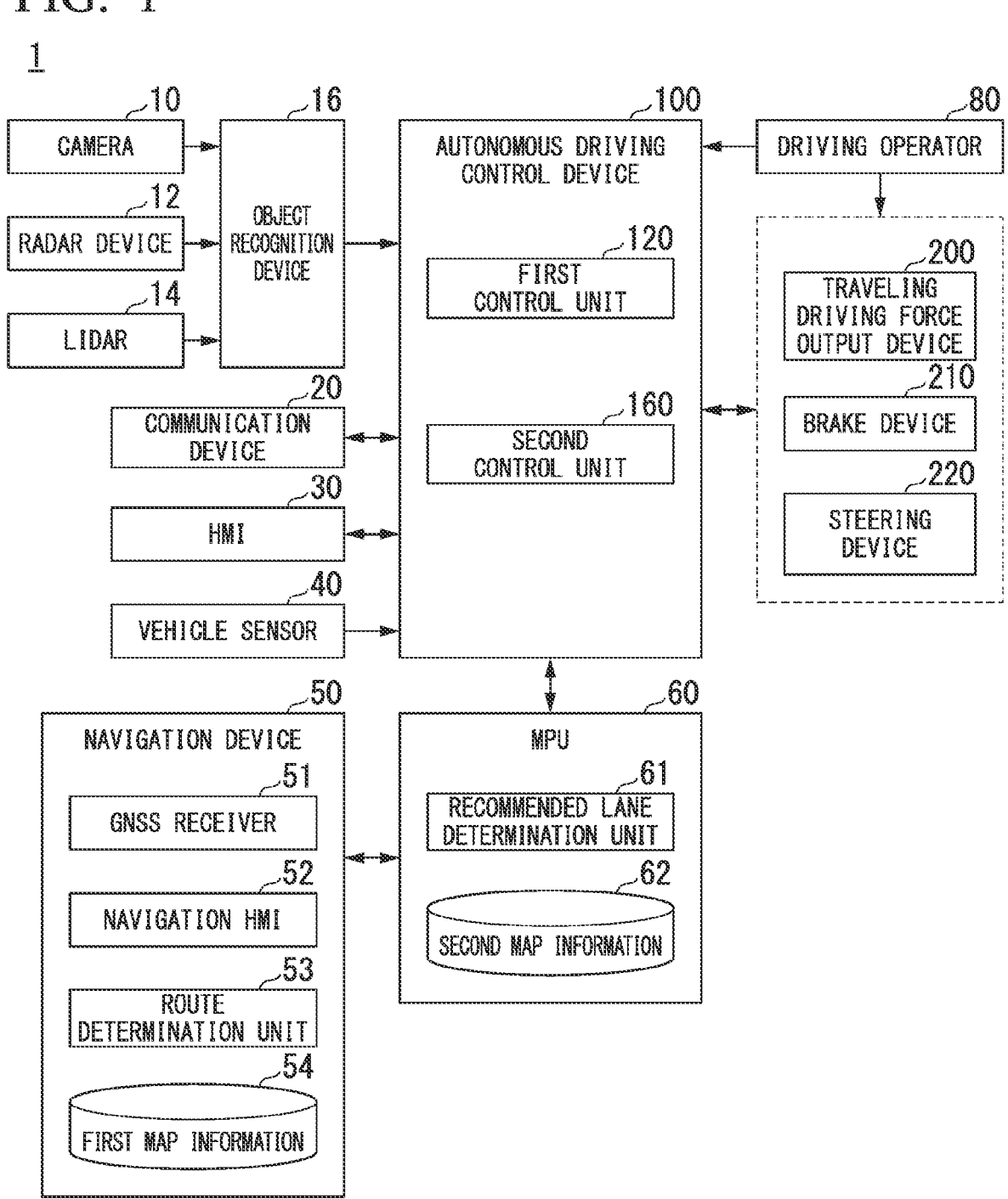
FIG. 1 is a configuration diagram of a vehicle system using a vehicle control device according to an embodiment.

FIG. 1 is a configuration diagram of a vehicle system 1 using a vehicle control device according to the present embodiment. A vehicle on which the vehicle system 1 is mounted is, for example, a two-wheeled, three-wheeled, or four-wheeled vehicle, and its driving source is an internal combustion engine such as a diesel engine or a gasoline engine, an electric motor, or a combination thereof. The electric motor operates using electric power generated by a generator connected to an internal combustion engine, or electric power discharged from a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an autonomous driving control device 100, a traveling driving force output device 200, a brake device 210, and a steering device 220. These devices and equipment are connected to each other via multiplex communication lines such as controller area network (CAN) communication lines, serial communication lines, wireless communication networks, or the like. The configuration illustrated in FIG. 1 is merely an example, and a portion of the configuration may be omitted, or another configuration may be added. The autonomous driving control device 100 is an example of a "vehicle control device".

The camera 10 is, for example, a digital camera that uses a solid-state imaging device such as a charge coupled device (CCD) or a complementary metal oxide semiconductor (CMOS). The camera 10 is attached to any location on the vehicle (hereinafter referred to as a host vehicle M) on which the vehicle system 1 is mounted. When the front of the vehicle is imaged, the camera 10 is attached to an upper portion of a front windshield, the rear surface of a rear-view mirror, or the like. For example, the camera 10 periodically and repeatedly images the surroundings of the host vehicle M. The camera 10 may be a stereo camera.

The radar device 12 emits radio waves such as millimeter waves to the surroundings of the host vehicle M, and detects radio waves reflected by an object (reflected waves) to detect at least the position (distance and direction) of the object. The radar device 12 is attached to any location on the host vehicle M. The radar device 12 may detect the position and speed of an object using a frequency modulated continuous wave (FM-CW) method.

The LIDAR 14 irradiates the surroundings of the host vehicle M with light (or electromagnetic waves with a wavelength close to light) and measures scattered light. The LIDAR 14 detects a distance to a target based on a period of time from light emission to light reception. The emitted light is, for example, a pulse-like laser beam. The LIDAR 14 is attached to any location on the host vehicle M.

The object recognition device 16 performs sensor fusion processing on detection results obtained by some or all of the camera 10, the radar device 12, and the LIDAR 14 to recognize the position, type, speed, and the like of an object. The object recognition device 16 outputs recognition results to the autonomous driving control device 100. The object recognition device 16 may output the detection results of the camera 10, the radar device 12, and the LIDAR 14 as they are to the autonomous driving control device 100.

The communication device 20 communicates with other vehicles existing in the vicinity of the host vehicle M using, for example, a cellular network, a Wi-Fi network, Bluetooth (registered trademark), dedicated short range communication (DSRC), or the like, or communicates with various server devices via a wireless base station.

The HMI 30 presents various information to an occupant in the host vehicle M and also receives the occupant's input operation. The HMI 30 includes various display devices, a speaker, a buzzer, a touch panel, switches, keys, and the like.

The vehicle sensor 40 includes a vehicle speed sensor that detects the speed of the host vehicle M, an acceleration sensor that detects an acceleration, a yaw rate sensor that detects an angular velocity around a vertical axis, a direction sensor that detects the direction of the host vehicle M, and the like.

The navigation device 50 includes, for example, a global navigation satellite system (GNSS) receiver 51, a navigation HMI 52, and a route determination unit 53. The navigation device 50 holds first map information 54 in a storage device such as a hard disk drive (HDD) or a flash memory. The GNSS receiver 51 specifies the position of the host vehicle M based on signals received from GNSS satellites. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partially or completely shared with the HMI 30 mentioned above. For example, the route determination unit 53 determines a route (hereinafter, a route on a map) from the position (or any input position) of the host vehicle M specified by the GNSS receiver 51 to a destination input by an occupant using the navigation HMI 52 by referring to first map information 54. For example, the first map information 54 is information in which a traveling route shape is expressed by links indicating roads and nodes connected by the links. The first map information 54 may include road curvatures, point of interest (POI) information, and the like. The route on the map is output to the MPU 60. The navigation device 50 may provide route guidance using the navigation HMI 52 based on the route on the map. The navigation device 50 may be realized, for example, by the functions of a terminal device such as a smartphone or a tablet terminal owned by an occupant. The navigation device 50 may transmit the current position and destination to a navigation server via the communication device 20, and acquire a route equivalent to the route on the map from the navigation server.

The MPU 60 includes, for example, a recommended lane determination unit 61, and holds second map information 62 in a storage device such as an HDD or a flash memory. The recommended lane determination unit 61 divides the route on the map provided by the navigation device 50 into a plurality of blocks (for example, divides the route into blocks of 100 [m] in a vehicle moving direction), and determines recommended lanes for each block with reference to the second map information 62. The recommended lane determination unit 61 determines which lane from the left the vehicle should travel. When there is a branch point in the route on the map, the recommended lane determination unit 61 determines a recommended lane so that the host vehicle M can travel on a reasonable route to a branch destination.

The second map information 62 is map information with higher accuracy than the first map information 54. The second map information 62 includes, for example, information on centers of lanes or information on boundaries between lanes. Further, the second map information 62 may include road information, traffic regulation information, address information (address/zip code), facility information, telephone number information, and the like. The second map information 62 may be updated at any time by the communication device 20 communicating with other devices.

The driving operator 80 includes, for example, an accelerator pedal, a brake pedal, a shift lever, a steering wheel, a deformed steering wheel, a joystick, and other operators. A sensor that detects the amount of operation or whether an operation has been performed is attached to the driving operator 80, and the detection results are output to the autonomous driving control device 100 or some or all of the traveling driving force output device 200, the brake device 210, and the steering device 220.

The autonomous driving control device 100 includes, for example, a first control unit 120 and a second control unit 160. Each of the first control unit 120 and the second control unit 160 are realized by, for example, a hardware processor such as a central processing unit (CPU) executing a program (software). In addition, some or all of these components may be realized by hardware (including circuitry) such as a large scale integration (LSI), an application specific integrated circuit (ASIC), a field-programmable gate array (FPGA), and a graphics processing unit (GPU), or may be realized by software and hardware in cooperation. The program may be stored in advance in a storage device such as the HDD or flash memory (a storage device including a non-transitory storage medium) of the autonomous driving control device 100, or may be stored in a detachable storage medium such as a DVD or a CD-ROM and be installed in the HDD or flash memory of the autonomous driving control device 100 by mounting the storage medium (non-transitory storage medium) on a drive device.

Figure 2:
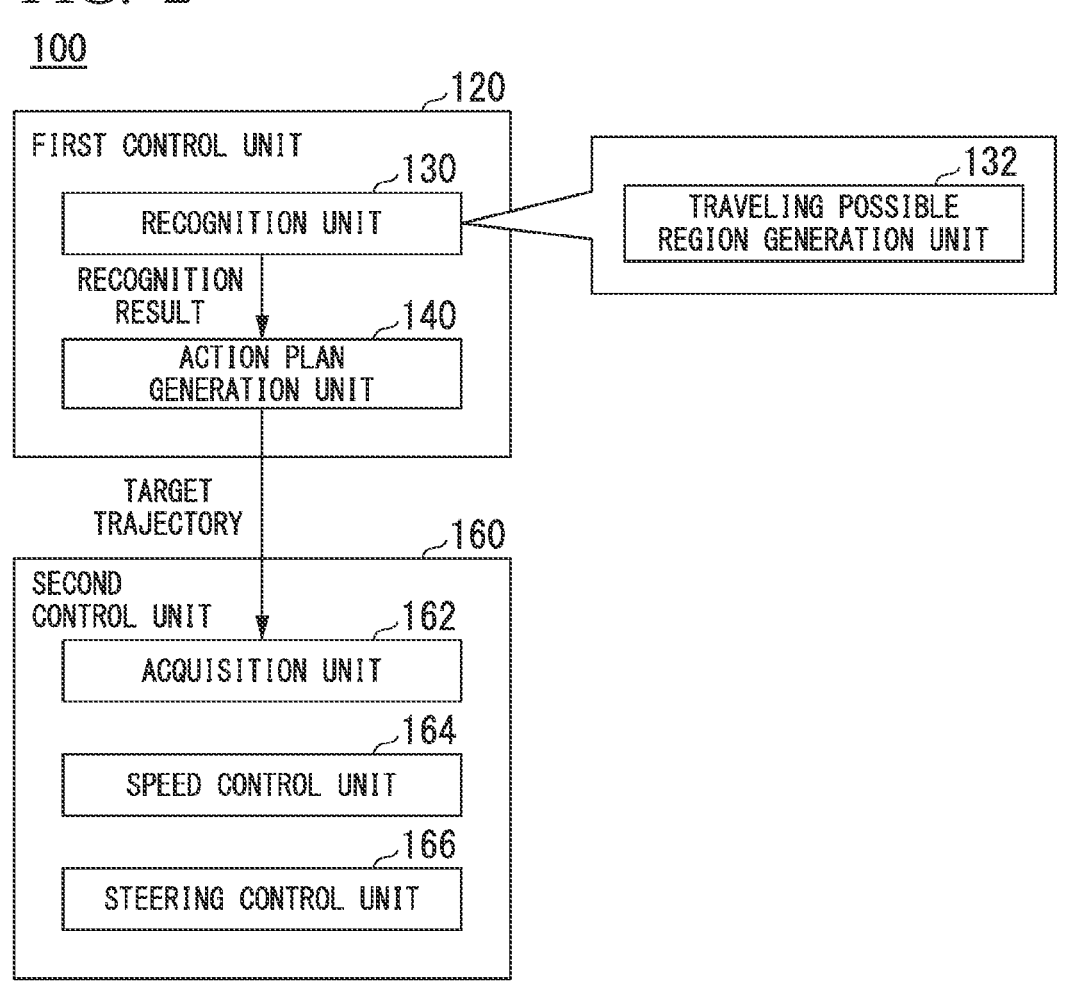
FIG. 2 is a functional configuration diagram of a first control unit and a second control unit.

FIG. 2 is a functional configuration diagram of the first control unit 120 and the second control unit 160. The first control unit 120 includes, for example, a recognition unit 130 and an action plan generation unit 140. The first control unit 120 realizes, for example, a function based on artificial intelligence (AI) and a function based on a model given in advance in parallel. For example, a function of "recognizing intersections" may be realized by executing recognition of intersections us1ing deep learning or the like and recognition based on conditions given in advance (including pattern-matchable signals, road markings, and the like) in parallel, scoring both, and comprehensively evaluating them. Thereby, the reliability of autonomous driving is secured.

The recognition unit 130 recognizes states of an object existing in the vicinity of the host vehicle M, such as the position, speed, acceleration, and the like of the object based on information input from the camera 10, the radar device 12, and the LIDAR 14 via the object recognition device 16. The position of the object is recognized, for example, as a position on absolute coordinates with a representative point (the center of gravity, the center of a drive shaft, or the like) of the host vehicle M as the origin and is used for control. The position of the object may be represented by a representative point such as the center of gravity or a corner of the object, or may be represented by an expressed region. The "state" of the object may include the acceleration or jerk of the object or an "action state" (for example, whether the vehicle is changing lanes or is about to change lanes).

The recognition unit 130 recognizes, for example, the lane in which the host vehicle M is traveling (traveling lane). For example, the recognition unit 130 recognizes the traveling lane by comparing a pattern of road marking lines (for example, an array of solid lines and broken lines) obtained from the second map information 62 and a pattern of road marking lines around the host vehicle M recognized from an image captured by the camera 10. The recognition unit 130 may recognize traveling lanes by recognizing not only road marking lines but also traveling road boundaries (road boundaries) including road marking lines, road shoulders, curbs, median strips, guardrails, and the like. In this recognition, the position of the host vehicle M acquired from the navigation device 50 and processing results obtained using the INS may be taken into consideration. The recognition unit 130 also recognizes stop lines, obstacles, red lights, toll booths, and other road events.

When the recognition unit 130 recognizes a traveling lane, the recognition unit 130 recognizes the position and posture of the host vehicle M with respect to the traveling lane. For example, the recognition unit 130 may recognize a deviation of a reference point of the host vehicle M from the center of the lane and an angle formed with respect to a line connecting the center of the lane in the traveling direction of the host vehicle M as a relative position and posture of the host vehicle M with respect to the traveling lane. Instead, the recognition unit 130 may recognize the position of the reference point of the host vehicle M with respect to any side edge of the traveling lane (road marking line or road boundary) as the relative position of the host vehicle M with respect to the traveling lane.

A traveling possible region generation unit 132 generates a traveling possible region which is a region in which the host vehicle M can travel, based on a traveling route shape defined by road marking lines recognized from an image captured by the camera 10 (for example, a region sandwiched between road marking lines recognized on both sides, and an example of "first information") and a traveling route shape defined by road marking lines included in the second map information 62 (for example, a region sandwiched between road marking lines on both sides included in the second map information 62, and an example of "second information"). For example, the traveling possible region generation unit 132 determines whether the road marking lines recognized from the image captured by the camera 10 (hereinafter referred to as "camera road marking lines") and the road marking lines included in the second map information 62 (hereinafter referred to as "map road marking lines") deviate from each other. When the camera road marking lines and the map road marking lines do not deviate from each other, the traveling possible region generation unit 132 generates a traveling route shape specified by these road marking lines as a traveling possible region. Processing performed when the camera road marking lines and the map road marking lines deviate from each other will be described below.

In principle, the action plan generation unit 140 generates a target trajectory on which the host vehicle M will automatically travel in the future (without depending on a driver's operation) and which passes through the traveling possible region generated by the traveling possible region generation unit 132 so that the host vehicle M travels in the recommended lane determined by the recommended lane determination unit 61 in principle and can cope with the surrounding situation of the host vehicle M. The target trajectory includes, for example, a speed element. For example, the target trajectory is expressed as a sequence of points (trajectory points) that the host vehicle M should reach. The trajectory point is a point that the host vehicle M should reach every predetermined traveling distance (for example, approximately several [m]) along a road. Separately, a target speed and a target acceleration are generated as a part of the target trajectory for each predetermined sampling time (for example, approximately every several fractions of a [sec]). The trajectory point may be a position that the host vehicle M should reach at the sampling time for each predetermined sampling time. In this case, information regarding the target speed and the target acceleration is expressed by intervals between the trajectory points.

The action plan generation unit 140 may set autonomous driving events when generating a target trajectory. The autonomous driving events include a constant-speed driving event, a low-speed following driving event, a lane change event, a branching event, a merging event, a takeover event, and the like. The action plan generation unit 140 generates a target trajectory corresponding to an activated event.

The second control unit 160 controls the traveling driving force output device 200, the brake device 210, and the steering device 220 so that the host vehicle M passes through the target trajectory generated by the action plan generation unit 140 at the scheduled time.

Referring back to FIG. 2, the second control unit 160 includes, for example, an acquisition unit 162, a speed control unit 164, and a steering control unit 166. The acquisition unit 162 acquires information regarding the target trajectory (trajectory point) generated by the action plan generation unit 140 and stores the information in a memory (not illustrated). The speed control unit 164 controls the traveling driving force output device 200 or the brake device 210 based on a speed element associated with the target trajectory stored in the memory. The steering control unit 166 controls the steering device 220 in accordance with the degree of curvature of the target trajectory stored in the memory. The processing of the speed control unit 164 and the steering control unit 166 is realized, for example, by a combination of feedforward control and feedback control. As an example, the steering control unit 166 executes feedforward control according to a curvature of a road in front of the host vehicle M and feedback control based on a deviation from the target trajectory in combination.

The traveling driving force output device 200 outputs a traveling driving force (torque) for driving the vehicle to driving wheels. The traveling driving force output device 200 includes, for example, a combination of an internal combustion engine, an electric motor, a transmission, and the like, and an electronic control unit (ECU) that controls them. The ECU controls the above-described configuration in accordance with information input from the second control unit 160 or information input from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor in accordance with information input from the second control unit 160 or information input from the driving operator 80 so that a brake torque corresponding to a braking operation is output to each wheel. The brake device 210 may include, as a backup mechanism, a mechanism that transmits hydraulic pressure, which is generated by operating a brake pedal included in the driving operator 80, to a cylinder via a master cylinder. The brake device 210 is not limited to the above-described configuration and may be an electronically controlled hydraulic brake device that controls an actuator in accordance with information input from the second control unit 160 and transmits hydraulic pressure of the master cylinder to the cylinder.

The steering device 220 includes, for example, a steering ECU and an electric motor. For example, the electric motor applies a force to a rack and pinion mechanism to change the direction of the steered wheels. The steering ECU drives the electric motor in accordance with information input from the second control unit 160 or information input from the driving operator 80 to change the direction of steered wheels.

Operation of Traveling Possible Region Generation Unit

As described above, the traveling possible region generation unit 132 generates a traveling possible region of the host vehicle M based on a traveling route shape which is defined by camera road marking lines (hereinafter referred to as a "camera traveling route shape") and a traveling route shape which is defined by map road marking lines (hereinafter referred to as a "map traveling route shape"), and the action plan generation unit 140 generates a target trajectory of the host vehicle M to pass through the generated traveling possible region. However, for example, when the host vehicle M travels near a branch road, a deviation occurs between the camera road marking lines and the map road marking lines, and the traveling possible region may not be recognized appropriately.

With such circumstances as a background, an object of the present invention is to be able to appropriately generate a traveling possible region of the host vehicle M based on a pattern related to stationary targets captured in a camera image even when a deviation occurs between camera road marking lines and map road marking lines near a branch road. More specifically, the traveling possible region generation unit 132 classifies the stationary targets captured in the camera image into vehicle stationary targets representing vehicles and non-vehicle stationary targets representing non-vehicles through arbitrary image processing and sets any one of a camera traveling route shape and a map traveling route shape as priority information based on a pattern of a positional relationship between the classified vehicle and non-vehicle stationary targets and the camera traveling route shape and map traveling route shape. The traveling possible region generation unit 132 generates any one of the camera traveling route shape and the map traveling route shape, which are set as priority information, as a traveling possible region.

Hereinafter, a pattern of a positional relationship between a stationary target, a camera traveling route shape, and a map traveling route shape, and priority information that is set in the pattern will be described. Processing to be described below is executed when the traveling possible region generation unit 132 detects a deviation between a camera road marking line and a map road marking line at a branch road (for example, when the sum of distances between a point group constituting the camera road marking line and a point group constituting the map road marking line is equal to or greater than a threshold value). Whether the host vehicle M is on the branch road may be determined based on, for example, a camera image or the second map information 62.

Figure 3:
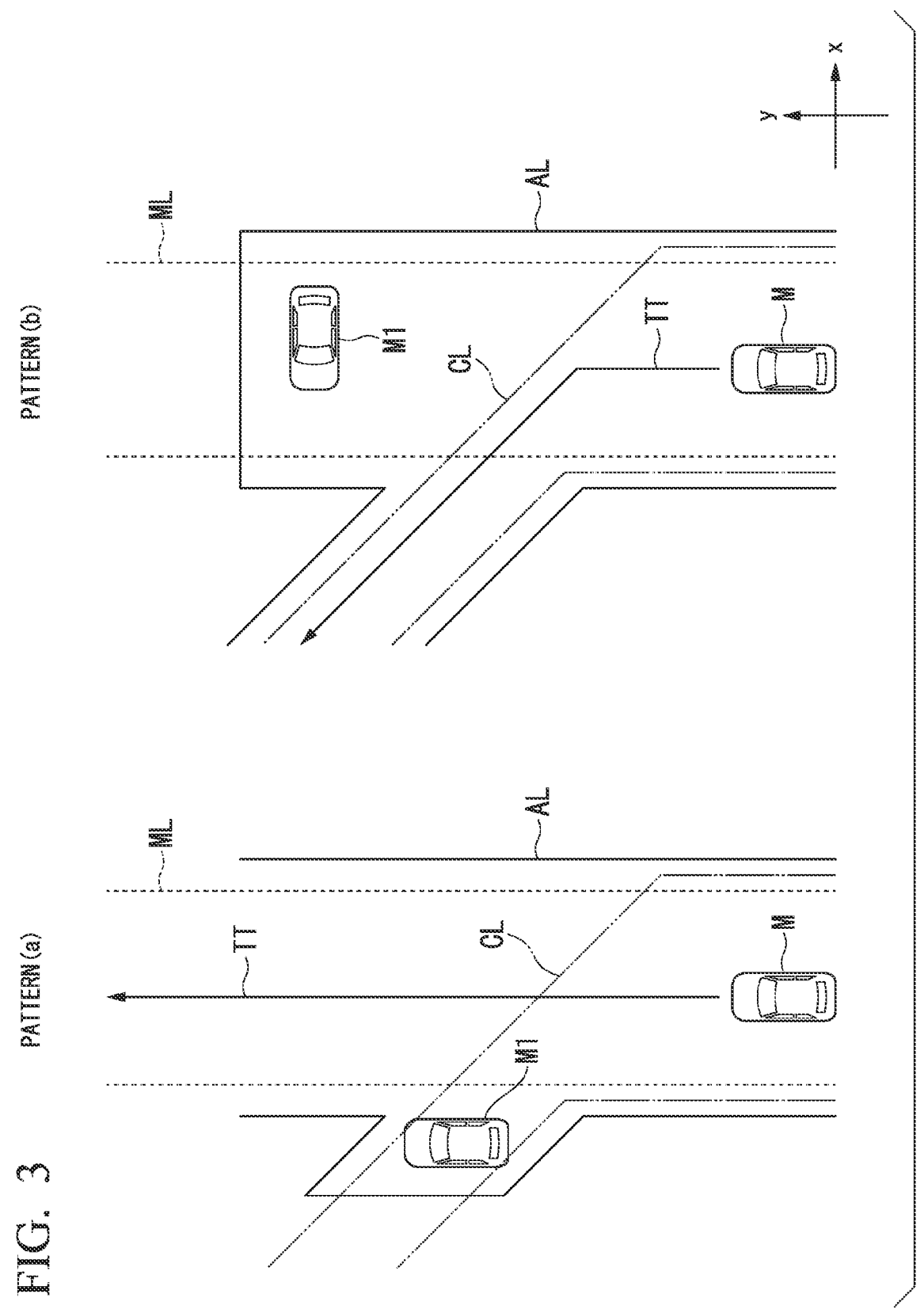
FIG. 3 is a diagram illustrating an example of a pattern related to a positional relationship between a stationary target, a camera traveling route shape, and a map traveling route shape.

FIG. 3 is a diagram illustrating an example of a pattern related to a positional relationship between a stationary target, a camera traveling route shape, and a map traveling route shape. In FIG. 3, a symbol ML represents a map road marking line, a symbol CL represents a camera road marking line, a symbol AL represents the actual road marking line, a symbol TT represents a generated target trajectory, and a symbol M1 represents a detected stationary vehicle. That is, a traveling route shape defined by the camera road marking lines CL on both sides represents a camera traveling route shape, and a traveling route shape defined by the map road marking lines ML on both sides represents a map traveling route shape. The traveling possible region generation unit 132 integrates a camera traveling route shape and a stationary target included in a camera image and a map traveling route shape included in the second map information 62 into the same coordinate system (xy plane in FIG. 3) and plots it to enable mutual comparison thereof. For example, the traveling possible region generation unit 132 can integrate the camera traveling route shape, the stationary target and the map traveling route shape into the same coordinate system and plot it by matching the position of the host vehicle M where the camera 10 is installed and the position of the host vehicle M in the second map information 62.

The traveling possible region generation unit 132 determines whether the detected stationary vehicle M1 is located in the camera traveling route shape or the map traveling route shape, and when the stationary vehicle M1 is within the camera traveling route shape, the traveling possible region generation unit 132 sets the map traveling route shape as priority information. On the other hand, when the stationary vehicle M1 is within the map traveling route shape, the traveling possible region generation unit 132 sets the camera traveling route shape as priority information. A pattern (a) in FIG. 3 represents a case where the stationary vehicle M1 is determined to be located within the camera traveling route shape and the map traveling route shape is set as priority information, and a pattern (b) in FIG. 3 represents a case where the stationary vehicle M1 is determined to be located within the map traveling route shape and the camera traveling route shape is set as priority information. For this reason, in the pattern (a) in FIG. 3, the traveling possible region generation unit 132 generates the map traveling route shape as a traveling possible region, and the action plan generation unit 140 generates a target trajectory TT of the host vehicle M so that the host vehicle M passes through the generated traveling possible region. On the other hand, in the pattern (b) in FIG. 3, the traveling possible region generation unit 132 generates the camera traveling route shape as a traveling possible region, and the action plan generation unit 140 generates a target trajectory TT of the host vehicle M so that the host vehicle M passes through the generated traveling possible region. In the present invention, "being located within the traveling route shape" may mean that the detected stationary target is completely included in the traveling route shape, or may mean that the detected stationary target is partially included in the traveling route shape (for example, by a predetermined area or more). For example, when at least a portion of the detected stationary target is located within the traveling route shape and the traveling route shape does not include a space where the host vehicle M can travel, it may be determined that the vehicle is "located within the traveling route shape." In the present embodiment, when a predetermined area or more of the stationary target is included in the traveling route shape, the traveling possible region generation unit 132 determines that the stationary target is located within the traveling route shape.

Figure 4:
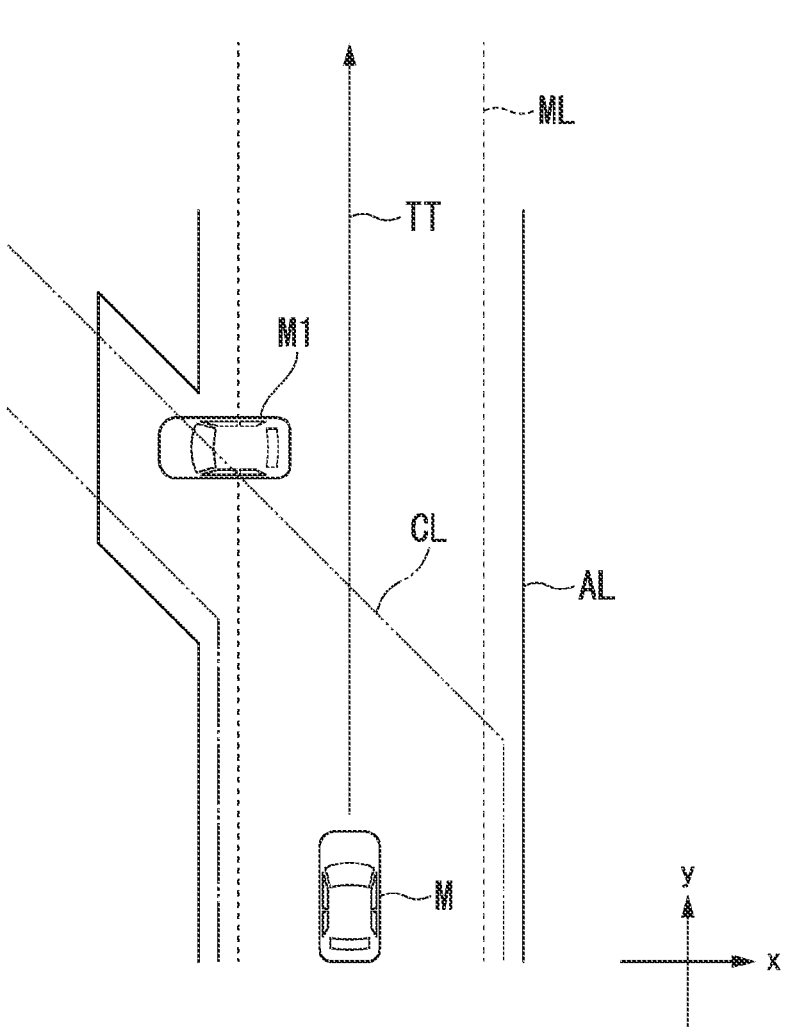
FIG. 4 is a diagram illustrating another example of a pattern related to a positional relationship between a stationary target, a camera traveling route shape, and a map traveling route shape.

FIG. 4 is a diagram illustrating another example of a pattern related to a positional relationship between a stationary target, a camera traveling route shape, and a map traveling route shape. A pattern (c) illustrated in FIG. 4 represents a situation in which the detected stationary vehicle M1 straddles both the camera traveling route shape and the map traveling route shape. When it is determined that the detected stationary vehicle M1 straddles both the camera traveling route shape and the map traveling route shape, the traveling possible region generation unit 132 sets the map traveling route shape as priority information and generates the map traveling route shape as a traveling possible region. The action plan generation unit 140 generates a target trajectory TT of the host vehicle M to pass through the generated traveling possible region. That is, at this time, the traveling possible region generation unit 132 determines that a camera road marking line has deviated from a main road in the direction of a branch road due to the presence of the branch road, and sets the map driving route shape as priority information.

At this time, as illustrated in FIG. 4, the action plan generation unit 140 generates the target trajectory TT of the host vehicle M to pass through the map traveling route shape. However, since the stationary vehicle M1 is in the map traveling route shape, the second control unit 160 performs deceleration control while causing the host vehicle M to travel along the target trajectory TT. Similarly, in the following description, when a stationary target exists in the camera traveling route shape or map traveling route shape set as priority information, the second control unit 160 performs at least deceleration control of the host vehicle M in the vicinity of the stationary target.

Figure 5:
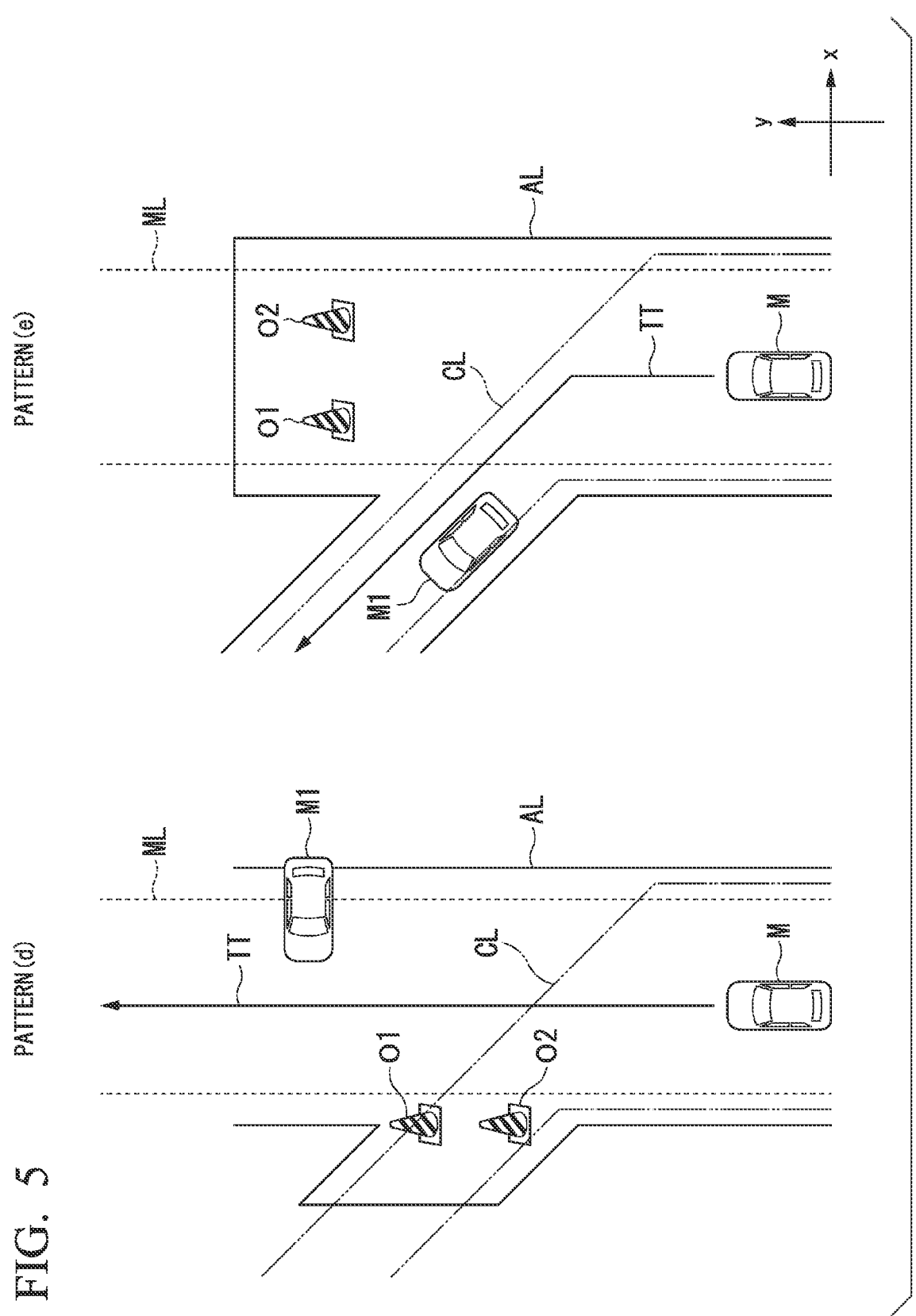
FIG. 5 is a diagram illustrating another example of a pattern related to a positional relationship between a stationary target, a camera traveling route shape, and a map traveling route shape.

FIG. 5 is a diagram illustrating another example of a pattern related to a positional relationship between a stationary target, a camera traveling route shape, and a map traveling route shape. In FIG. 5, symbols O1 and O2 represent non-vehicle stationary targets detected from a camera image. When the detected stationary vehicle M1 is located in either one of the camera traveling route shape or the map traveling route shape, and one or more non-vehicle stationary targets are disposed in the other of the camera traveling route shape or the map traveling route shape, the traveling possible region generation unit 132 sets the one traveling route shape as priority information. That is, the traveling possible region generation unit 132 evaluates that the traveling route shape in which the vehicle stationary target exists is more reliable than the non-vehicle stationary target. A pattern (d) in FIG. 5 represents a case where it is determined that the stationary vehicle M1 is located within the map traveling route shape and the non-vehicle stationary objects O1 and O2 are located within the camera traveling route shape, and the map traveling route shape is set as priority information. A pattern (e) in FIG. 5 represents a case where it is determined that the stationary vehicle M1 is located within the camera traveling route shape and the non-vehicle stationary objects O1 and O2 are located within the map traveling route shape, and the camera traveling route shape is set as priority information. For this reason, in the pattern (d) in FIG. 5, the traveling possible region generation unit 132 generates the map traveling route shape as a traveling possible region, and the action plan generation unit 140 generates a target trajectory TT of the host vehicle M so that the host vehicle M passes through the generated traveling possible region. On the other hand, in the pattern (e) in FIG. 5, the traveling possible region generation unit 132 generates the camera traveling route shape as a traveling possible region, and the action plan generation unit 140 generates a target trajectory TT of the host vehicle M so that the host vehicle M passes through the generated traveling possible region.

Figure 6:
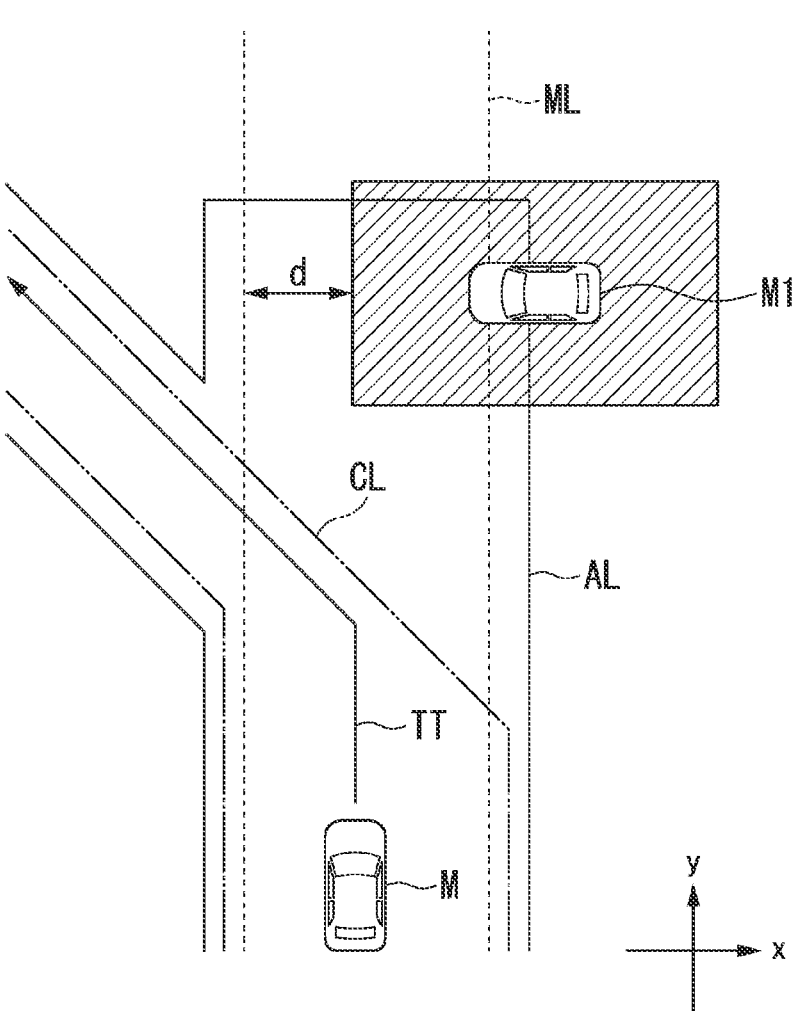
FIG. 6 is a diagram illustrating another example of a pattern related to a positional relationship between a stationary target, a camera traveling route shape, and a map traveling route shape.

Furthermore, the traveling possible region generation unit 132 may generate a traveling possible region based on a region obtained by adding an allowance size (margin) to a detected size of the detected stationary target. FIG. 6 is a diagram illustrating another example of a pattern related to a positional relationship between a stationary target, a camera traveling route shape, and a map traveling route shape. A pattern (f) illustrated in FIG. 6 represents a situation in which the area of the detected stationary vehicle M1 included in the map traveling route shape is small (that is, equal to or less than a predetermined area). At this time, when the area of the region obtained by adding the allowance size (a diagonal shaded portion in FIG. 6) to the detected size of the detected stationary vehicle M1 is equal to or more than the predetermined area even when the detected stationary vehicle M1 has a small area included in the map traveling route shape, the traveling possible region generation unit 132 may determine that the detected stationary vehicle M1 is included in the map traveling route shape. In this case, similarly to the pattern (b) in FIG. 3, the traveling possible region generation unit 132 generates the camera traveling route shape as a traveling possible region, and the action plan generation unit 140 generates a target trajectory TT of the host vehicle M so that the host vehicle M passes through the generated traveling possible region. Similarly, when the area of the region obtained by adding the allowance size to the detected size of the detected stationary vehicle M1 is equal to or more than the predetermined area even when the area of the detected stationary vehicle M1 included in the camera traveling route shape is small, the traveling possible region generation unit 132 may determine that the detected stationary vehicle M1 is included in the camera traveling route shape and generate the map traveling route shape as a traveling possible region.

For example, in the pattern (f) in FIG. 6, the traveling possible region generation unit 132 measures a distance d between an end of the region obtained by adding the allowance size to the detected size of the stationary target and the map road marking line ML, and when the measured distance d is equal to or greater than a threshold value Th (for example, the horizontal width of the host vehicle M), the traveling possible region generation unit 132 may generate the map driving route shape as a traveling possible region. In this case, the traveling possible region generation unit 132 may make the allowance size variable depending on the speed of the host vehicle M and the distance from the other vehicle M1. For example, the traveling possible region generation unit 132 may set the allowance size to be larger as the speed of the host vehicle M becomes higher, or may set the allowance size to be larger as a forward distance between the host vehicle M1 and the other vehicle M1 becomes smaller.

Figure 7:
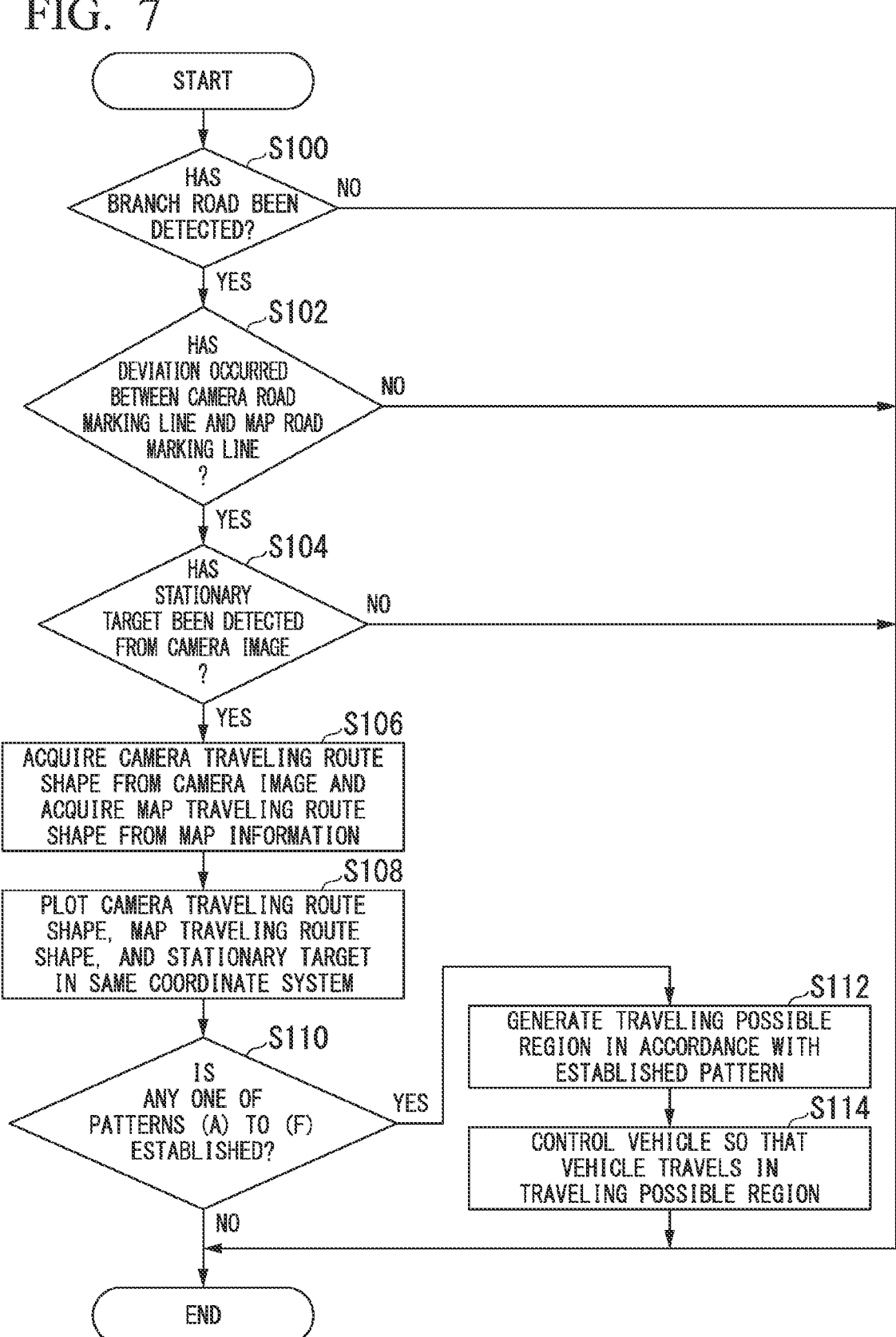
FIG. 7 is a flowchart showing an example of a flow of processing executed by the vehicle control device.

Next, a flow of processing executed by the vehicle control device according to the present embodiment will be described with reference to FIG. 7. FIG. 7 is a flowchart showing an example of a flow of processing executed by the vehicle control device. The processing of this flowchart illustrated in FIG. 7 is repeatedly executed, for example, while the host vehicle M is traveling.

First, the recognition unit 130 determines whether a branch road has been detected (step S100). When it is determined that a branch road has not been detected, the recognition unit 130 terminates the processing of this flowchart. On the other hand, when it is determined that a branch road has been detected, the recognition unit 130 determines whether a deviation has occurred between the camera road marking line CL and the map road marking line ML (step S102). When it is determined that no deviation has occurred between the camera road marking line CL and the map road marking line ML, the recognition unit 130 terminates the processing of this flowchart. On the other hand, when it is determined that a deviation has occurred between the camera road marking line CL and the map road marking line ML, the recognition unit 130 then determines whether a stationary target has been detected from a camera image (step S104). When it is determined that no stationary target has been detected from the camera image, the recognition unit 130 terminates the processing of this flowchart.

When it is determined that a stationary target has been detected from the camera image, the traveling possible region generation unit 132 acquires a camera traveling route shape defined by the camera road marking line CL from the camera image, and also acquires a map traveling route shape from the second map information 62 (step S106). Next, the traveling possible region generation unit 132 plots the acquired camera traveling route shape, map traveling route shape, and stationary target in the same coordinate system (step S108). Next, the traveling possible region generation unit 132 determines whether any one of the patterns (a) to (f) is established based on the plotted information (step S110).

When it is determined that one of the patterns (a) to (f) is established, the traveling possible region generation unit 132 generates a traveling possible region by the method described above in accordance with the established pattern (step S112). Next, the action plan generation unit 140 generates a target trajectory TT of the host vehicle M to pass through the generated traveling possible region, and the second control unit 160 causes the host vehicle M to travel along the generated target trajectory TT. Thereby, the processing of this flowchart is terminated.

In step S110 of the flowchart described above, the traveling possible region generation unit 132 determines whether any one of the patterns (a) to (f) is established. However, the present invention is not limited thereto, and it may be determined whether any one of some (for example, the patterns (a) to (c)) of the patterns (a) to (f) is established.

According to the present embodiment described above, any one of a camera traveling route shape and a map traveling route shape is set as priority information based on the camera traveling route shape defined by a road marking line captured in a camera image, the map traveling route shape defined by a road marking line included in map information, and a detected stationary target while the host vehicle M is traveling near a branch road, and a traveling possible region is generated from the set priority information. Thereby, even when a deviation occurs between the road marking line captured in the camera image and the road marking line included in the map information, the vehicle can be driven appropriately.

The embodiment described above can be expressed as follows.

A vehicle control device including:

a storage medium configured to store computer-readable instructions; and a processor configured to be connected to the storage medium, wherein the processor executes the computer-readable instructions to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, control traveling of the vehicle so that the vehicle travels in the generated traveling possible region, and set any one of the first information and the second information as priority information based on information regarding one or more stationary targets included in the first information or the second information to generate the traveling possible region from the set priority information.

Although the mode for implementing the invention has been described above using the embodiments, the invention is not limited to these embodiments, and various modifications and substitutions can be added without departing from the gist of the invention.

What is claimed is:

1. A vehicle control device comprising:

a storage medium configured to store computer-readable instructions; and a processor configured to be connected to the storage medium, wherein the processor executes the computer-readable instructions to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, and control traveling of the vehicle so that the vehicle travels in the generated traveling possible region, and the processor further sets any one of the first information and the second information as priority information based on information regarding one or more stationary targets included in the first information or the second information to generate the traveling possible region from the set priority information; and wherein the processor sets any one of the first information and the second information as the priority information based on a region including the one or more stationary targets obtained by adding an allowance size to detected sizes of the one or more stationary targets to generate the traveling possible region.

2. The vehicle control device according to claim 1, wherein the processor plots the traveling route shape included in the first information, the traveling route shape included in the second information, and one or more stationary targets included in the first information or the second information in the same coordinate system, and the processor sets the second information as the priority information when the stationary targets are within the traveling route shape included in the first information in the coordinate system, and sets the first information as the priority information when the stationary targets are within the traveling route shape included in the second information.

3. The vehicle control device according to claim 1, wherein the processor plots the first information, the second information, and the stationary target in the same coordinate system, the processor classifies the stationary targets into a vehicle stationary target representing a vehicle and a non-vehicle stationary target representing a non-vehicle, and when the vehicle stationary target is within the traveling route shape included in one of the first information and the second information, and one or more of the non-vehicle stationary targets are disposed in the traveling route shape included in the other of the first information and the second information, the processor sets the one of the first information and the second information as the priority information.

4. The vehicle control device according to claim 1, wherein, when the processor determines that the vehicle is near a branch road, the processor generates the traveling possible region based on the first information and the second information.

5. The vehicle control device according to claim 1, wherein the processor sets the first information and the second information as a region sandwiched by a left road marking line and a right road marking line in front of the vehicle, and generates the traveling possible region based on information regarding the one or more stationary targets plotted in the set region.

6. A vehicle control method comprising:

causing a computer to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, control traveling of the vehicle so that the vehicle travels in the generated traveling possible region, set any one of the first information and the second information as priority information based on information regarding one or more stationary targets included in the first information or the second information to generate the traveling possible region from the set priority information, and set any one of the first information and the second information as the priority information based on a region including the one or more stationary targets obtained by adding an allowance size to detected sizes of the one or more stationary targets to generate the traveling possible region.

7. A non-transitory storage medium that stores a program causing a computer to acquire a camera image obtained by imaging a surrounding situation of a vehicle, generate a traveling possible region, which is a region where the vehicle is able to travel, based on first information including a traveling route shape defined by a road marking line captured in the camera image and second information including a traveling route shape defined by a road marking line included in map information, control traveling of the vehicle so that the vehicle travels in the generated traveling possible region, set any one of the first information and the second information as priority information based on information regarding one or more stationary targets included in the first information or the second information to generate the traveling possible region from the set priority information, and set any one of the first information and the second information as the priority information based on a region including the one or more stationary targets obtained by adding an allowance size to detected sizes of the one or more stationary targets to generate the traveling possible region.

* * * * *